(12) United States Patent
Omara et al.

(10) Patent No.: US 9,418,175 B2
(45) Date of Patent: Aug. 16, 2016

(54) ENUMERATION OF A CONCURRENT DATA STRUCTURE

(75) Inventors: Emad Omara, Bellevue, WA (US);
John J. Duffy, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 376 days.

(21) Appl. No.: 12/414,860

(22) Filed: Mar. 31, 2009

(65) Prior Publication Data

US 2010/0250507 A1 Sep. 30, 2010

(51) Int. Cl.
| G06F 7/00 | (2006.01) |
| G06F 17/00 | (2006.01) |
| G06F 17/30 | (2006.01) |

(52) U.S. Cl.
CPC .............................. *G06F 17/30958* (2013.01)

(58) Field of Classification Search
USPC .......................................... 707/704, E17.007
See application file for complete search history.

(56) References Cited

U.S. PATENT DOCUMENTS

| 6,529,948 | B1 | 3/2003 | Bowman-Amuah |
| 6,823,351 | B1 | 11/2004 | Flood et al. |
| 7,103,887 | B2 | 9/2006 | Shavit et al. |
| 2002/0111929 | A1* | 8/2002 | Pudipeddi et al. ................. 707/1 |
| 2004/0002974 | A1* | 1/2004 | Kravitz et al. ..................... 707/8 |
| 2004/0039758 | A1* | 2/2004 | Li ................................. 707/206 |
| 2005/0289143 | A1* | 12/2005 | Oshri et al. ........................ 707/8 |
| 2006/0123156 | A1* | 6/2006 | Moir et al. ....................... 710/33 |
| 2006/0265373 | A1* | 11/2006 | McKenney et al. ............... 707/8 |
| 2006/0282438 | A1* | 12/2006 | Zhou et al. ..................... 707/100 |
| 2007/0143326 | A1 | 6/2007 | Chase et al. |
| 2007/0198792 | A1* | 8/2007 | Dice et al. ...................... 711/163 |
| 2007/0271450 | A1* | 11/2007 | Doshi et al. ................... 712/245 |
| 2009/0043770 | A1* | 2/2009 | Wang ................................. 707/8 |

OTHER PUBLICATIONS

Herman, Todd et al.,"Visual Basic 2005 Recipes, A problem-Solution Approach" 2007, 39-75, DO1: 10.1007/978-1-4302-0295-0_2.*

(Continued)

*Primary Examiner* — Alex Gofman
*Assistant Examiner* — Muluemebet Gurmu
(74) *Attorney, Agent, or Firm* — Kevin Sullivan; Doug Barker; Micky Minhas

(57) ABSTRACT

An enumerable concurrent data structure referred to as a concurrent bag is provided. The concurrent bag is accessible by concurrent threads and includes a set of local lists configured as a linked list and a dictionary. The dictionary includes an entry for each local list that identifies the thread that created the local list and the location of the local list. Each local list includes a set of data elements configured as a linked list. A global lock on the concurrent bag and local locks on each local list allow operations that involve enumeration to be performed on the concurrent bag.

20 Claims, 7 Drawing Sheets

(56) References Cited

OTHER PUBLICATIONS

"Feedback Requested: Enumerating Concurrent Collections", Retrieved at<<http://blogs.msdn.com/pfxteam/archive/2008/08/12/8852005.aspx>>, Jun. 2008, pp. 11.

Misra Jayadev, "A Discipline of Multiprogramming:A Programming Theory for Distributed Applications", Retrieved at<<www.cs.utexas.edu/users/psp/seuss.pdf >>, pp. 435.

Kokholm, et al."C5: Copenhagen Comprehensive C# Collection Classes and Experience with Generic C#", Retrieved at<<http://www.itu.dk/research/c5/c5talk-microsoft.pdf>>, Jun. 15, 2004, pp. 35.

Henning, et al."Distributed Programming with Ice", Retrieved at<<http://www.zeroc.com/Ice-Manual.pdf>>, pp. 1944.

Blumofe, et al."Scheduling Multithreaded Computations by Work Stealing", Retrieved at<<http://supertech.csail.mit.edu/papers/steal.pdf>>, pp. 1-29.

Hendler, et al."A Dynamic-Sized Non-Blocking Work-Stealing Deque", Retrieved at<<http://research.sun.com/technical-reports/2005/smli_tr-2005-144.pdf>>, Nov. 2005, pp. 69.

* cited by examiner

ENUMERATION OF A CONCURRENT DATA STRUCTURE

BACKGROUND

Processes executed in a computer system may be configured to execute different parts of the process concurrently. Where these different parts of the process may access the same data concurrently, the accesses to the data are typically synchronized. For example, when a thread of a process accesses data, it generally invokes a lock or other synchronization technique to ensure that no other thread of the process performs a conflicting access to the data. The synchronization prevents data from being corrupted but adds processing overhead to each data access and may serialize the access to the data by different threads. This serialization may inhibit the performance and scalability of a process, particularly where there are many independent processing resources that execute threads.

A process may wish to perform concurrent operations on a collective set of data. In doing so, different threads of the process may add data to or remove data from the collective set of data in an arbitrary order. The process may wish to enumerate the collective set of data at some point in the execution. While various synchronization mechanisms may be used to allow the collective set of data to be enumerated, the synchronization mechanisms may inhibit the performance and scalability of the process.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An enumerable concurrent data structure referred to as a concurrent bag is provided. The concurrent bag is accessible by concurrent threads and includes a set of local lists configured as a linked list and a dictionary. The dictionary includes an entry for each local list that identifies the thread that created the local list and the location of the local list. Each local list includes a set of data elements configured as a linked list. A global lock on the concurrent bag and local locks on each local list allow operations that involve enumeration to be performed on the concurrent bag.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
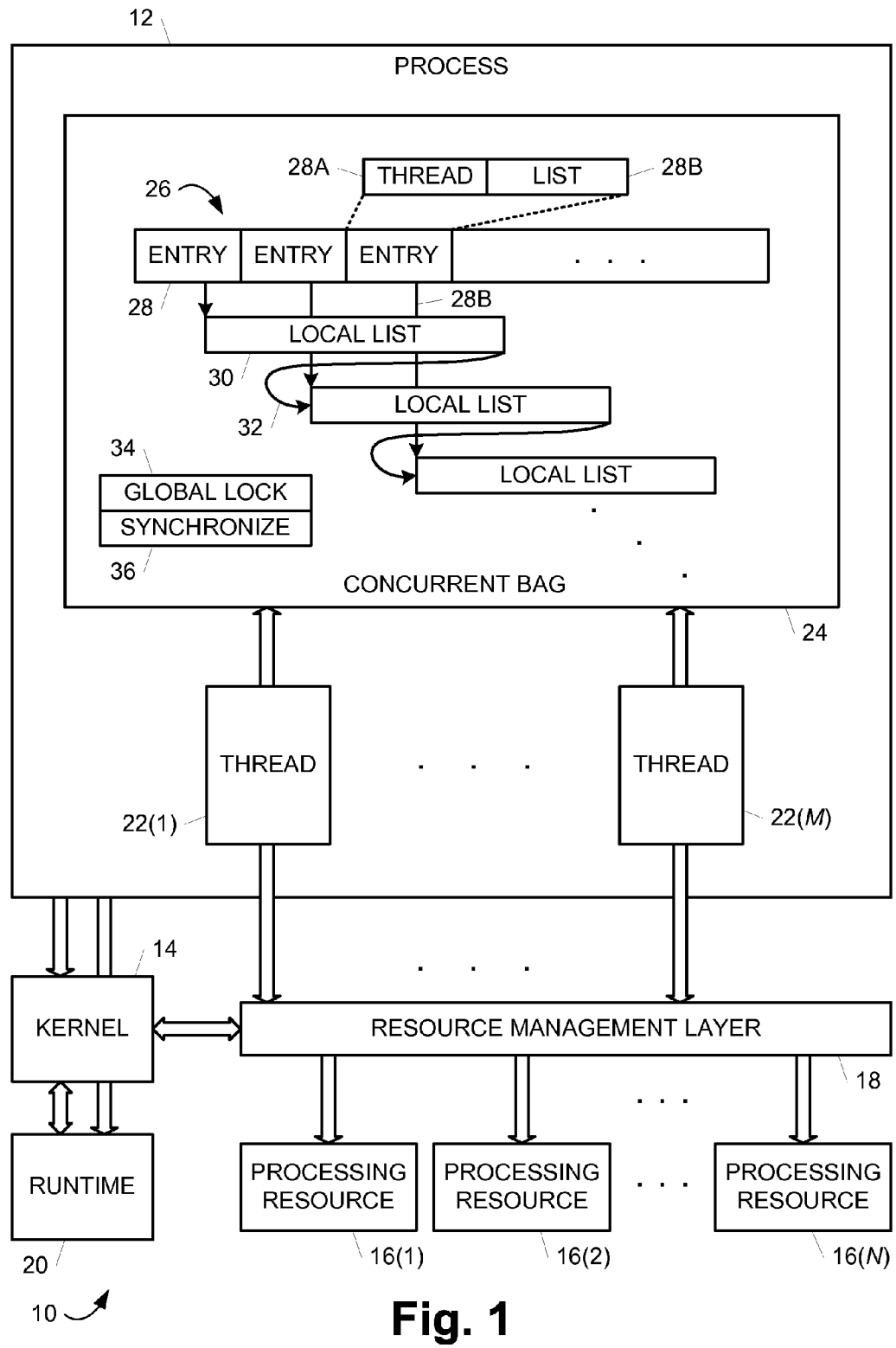
FIG. 1 is a block diagram illustrating an embodiment of a runtime environment with a process that is executing multiple concurrent threads.

FIG. 1 is a block diagram illustrating an embodiment of a runtime environment 10 with a process 12 that is executing multiple concurrent threads 22(1)-22(M) where M is greater than or equal to two and may vary during the execution of process 12.

Runtime environment 10 represents a runtime mode of operation in a computer system, such as a computer system 100 shown in FIG. 6 and described in additional detail below, where the computer system is executing instructions. The computer system generates runtime environment 10 from a kernel 14, processing resources 16(1)-16(N) where N is greater than or equal to one and may vary during the execution of process 12, a resource management layer 18, and a runtime platform 20. Runtime environment 10 allows process 12 to be executed by the computer system along any other processes that co-exist with process 12 (not shown) using kernel 14, processing resources 16(1)-16(N), resource management layer 18, and runtime platform 20. Runtime environment 10 operates in conjunction with kernel 14 and/or resource management layer 18 to allow process 12 to obtain processor and other resources of the computer system (e.g., processing resources 16(1)-16(N)).

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space of the computer system. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

Process 12 includes an allocation of processing and other resources that execute threads 22. Process 12 obtains access to the processing and other resources in the computer system from kernel 14, resource management layer 18, and runtime platform 20. Process 12 includes a sequence of instructions that perform work when executed by threads 22 in the computer system. Each thread 22 includes program state and machine state information that allows blocking and unblocking of threads 22. The blocking may include preemptive and/or cooperative blocking. Threads 22 may be created or terminated as specified by process 12 and/or kernel 14.

Kernel 14 manages processing and other resources of the computer system and provides a set of functions that allow process 12 and other processes in the computer system to access and use the components. In addition, kernel 14 offers threads 22 to process 12 and allocates memory of the computer system to process 12. Kernel 14 may allocate the memory in any suitable fixed or variable sizes (e.g., pages of 4 kilobytes (KB) to 64 KB).

Processing resources 16 reside in execution cores of a set or one or more processor packages (e.g., one or more processor packages 102 shown in FIG. 6 and described in additional detail below) of the computer system. Each processing resource 16 is configured to execute instructions independently or substantially independently from the other execution cores and includes a machine state. Processing resources 16 may be included in a single processor package or may be distributed across multiple processor packages. Each execution core in a processor package may include one or more processing resources 16.

Resource management layer 18 allocates processing resources 16 to process 12 to cause process 12 and threads 22 to be executed by the allocated processing resources 16. Resource management layer 18 exists separately from kernel 14 in the embodiment of FIG. 1. In other embodiments, resource management layer 18 or some or all of the functions thereof may be included in kernel 14.

Runtime platform 20 includes instructions that are executable in conjunction with kernel 14 and resource management layer 18 to generate runtime environment 10 and provide runtime functions to process 12 and other processes. These runtime functions include a concurrent bag function that creates concurrent bag 24 as will be described below. The runtime functions may be included in computer system 100 as a library of functions or other suitable programming construct that makes the functions available to process 12 and other processes in runtime environment 10. In other embodiments, some or all of the runtime functions may be as an integrated part of kernel 14 and/or resource management layer 18.

Process 12 causes concurrent bag 24 to be created via the concurrent bag function provided by runtime platform 20. Concurrent bag 24 is a data structure that forms a concurrent collection of data elements 46 (shown in FIG. 2) that is accessible by multiple threads 22. The concurrent bag function may be implemented as an application programming interface (API) or other suitable programming construct in runtime platform 20.

Concurrent bag 24 includes a concurrent dictionary 26 and a linked list of local lists 30 of data elements 46. Dictionary 26 includes an entry 28 for each local list 30 where each entry 28 includes a thread identifier 28A that identifies a thread 22 that created the corresponding local list 30 as the key and a list identifier 28B that identifies a location of the corresponding local list 30 as the value. The set of local lists 30 are configured as a linked list by including a next list identifier 32 with each local list 30 that identifies the head of a next local list 30.

The linked list of local lists 30 may be locked using a global lock 34 or other suitable synchronization mechanism. A thread 22 that acquires global lock 34 prevents all other threads 22 from adding or deleting local lists 30 from the linked list until the thread 22 releases global lock 34. Global lock 34, however, does not prevent threads 22 from adding, removing, or stealing data elements 46 from local lists 30.

Concurrent bag 24 also includes a synchronization indicator 36. Synchronize indicator 36 indicates whether synchronization (e.g., a local lock 60) is to be used when a thread 22 performs an add operation or a remove operation to the linked list or steals a data element 46 from the linked list. If synchronization is to be used, then the thread 22 acquires the local lock 60 of the local list 30 prior to performing a synchronized add operation or a synchronized remove operation or stealing a data element 46 without regard to the number of data elements 46 in the linked list of data elements 46. If not, then the thread 22 performs the add operation or remove operation without synchronization if the linked list of data elements 46 includes two or more data elements 46.

Figure 2:
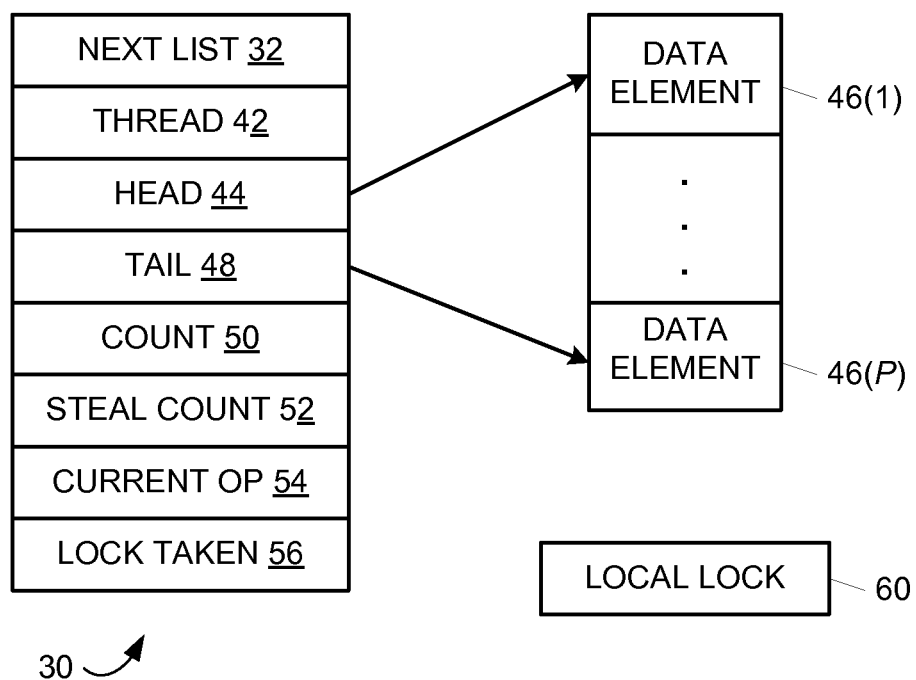
FIG. 2 is a block diagram illustrating an embodiment of a local list.

As shown in FIG. 2, each local list 30 includes a next list identifier 32, a thread identifier 42, a head identifier 44, a set of data elements 46 configured as a linked list, a tail identifier 48, a count 50, a steal count 52, a current operation indicator 54, and a lock taken indicator 56. Each local list 30 may be locked using a corresponding local lock 60 or other suitable synchronization mechanism.

Thread identifier 42 identifies the thread 22 that created the corresponding local list 30.

Head identifier 44 and tail identifier 48 identifies the head and the tail of a linked list, respectively, formed by the set of data elements 46(1)-46(P) of the corresponding local list 30, where P represents the Pth data element 46 at any point in the execution of process 12. The set of data elements 46 is configured as a linked list to allow the thread 22 that created the corresponding local list 30 and one other thread 22 to concurrently access the linked list where the linked list includes two or more data elements 46. For example, the thread 22 that created the corresponding local list 30 may access (i.e., add or remove) the data element 46(1) at the head of the linked list while another thread 22 concurrently steals (i.e., removes) the data element 46(P) at the tail of the linked list if P is greater than or equal to two.

Count 50 identifies the number data elements 46 that have been added to and removed from in the linked list by the thread 22 that created the corresponding local list 30 (i.e., the thread 22 identified in thread identifier 42). Count 50 is incremented each time that a data element 46 is added to the linked list by the thread 22 that created the corresponding local list 30 and decremented each time that a data element 46 is removed from the linked list by the thread 22 that created the corresponding local list 30 in one embodiment.

Steal count 52 identifies the number data elements 46 that have been stolen (i.e., removed) from in the linked list by a threads 22 other than the thread 22 that created the corresponding local list 30. Steal count 52 is incremented each time that a data element 46 is stolen from the linked list by a threads 22 other than the thread 22 that created the corresponding local list 30.

Current operation indicator 54 is set by the thread 22 that created the corresponding local list 30 to indicate whether an unsynchronized add operation, an unsynchronized remove operation, or no operation is being performed on the linked list of data elements 46. The thread 22 performs an add operation to add a data element 46 to the linked list and performs a remove operation to remove a data element 46 from the linked list. Current operation indicator 54 indicates that no operation is being performed any time that no unsynchronized add or remove operation is being performed by the thread 22.

Lock taken indicator 56 indicates whether the local lock 60 is currently taken or is currently available. A thread 22 that acquires the local lock 60 prevents all other threads 22 from performing synchronized add and remove operations on the corresponding local list 30 and stealing from the corresponding local list 30 until the thread 22 releases the local lock 60.

Concurrent bag 24 attempts to minimize the use of synchronization (e.g., minimize the use of global lock 34 and local locks 60) in accessing data elements 46 in concurrent bag 24 from multiple threads 22 while preserving thread safety between threads 22 as described below with reference to FIGS. 3 and 4A-4B. In addition, concurrent bag 24 provides for enumeration to support various operations for concurrent bag 24 as described below with reference to FIG. 5. The synchronization policies described with reference to FIGS. 3 and 4A-4B allow concurrent bag 24 to be frozen for enumeration as described with reference to FIG. 5.

Figure 3:
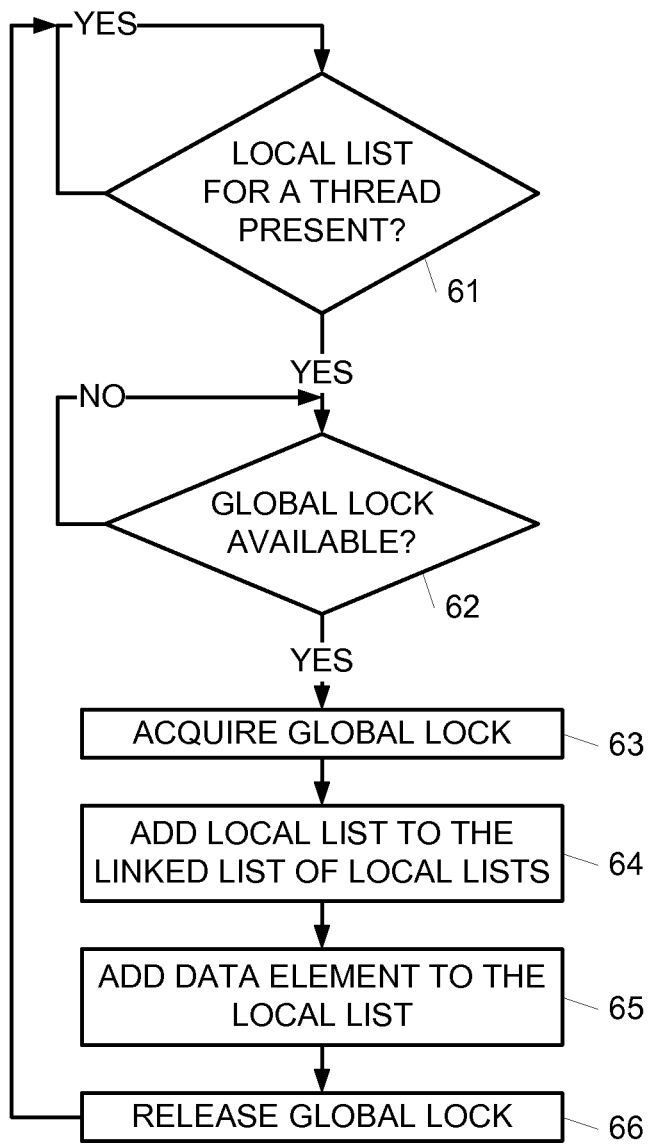
FIG. 3 is a flow chart illustrating an embodiment of a method for adding local lists to a data structure.

FIG. 3 is a flow chart illustrating an embodiment of a method for adding local lists 30 to concurrent bag 24. The embodiment of FIG. 3 will now be described with reference to the embodiments of FIGS. 1 and 2 where a concurrent bag 24 has been created. In one embodiment, thread 22 creates concurrent bag 24 by calling a function in runtime platform 20. In other embodiments, thread 22 creates concurrent bag 24 using other suitable programming constructs or one or more functions located outside of runtime platform 20 but otherwise in or accessible to the computer system.

In FIG. 3, any time that an arbitrary thread 22 seeks to add a data element to a local list 30 in concurrent bag 24, the thread 22 determines whether a local list 30 for the thread 22 is present in concurrent bag 24, as indicated in a block 61, by locating an entry 28 for the thread 22 in dictionary 26. If an entry 28 for the thread 22 is located, then the thread 22 adds the data element 46 to the local list 30 as described in the method of FIG. 4A below. If not, then the thread 22 determines whether global lock 34 of concurrent bag 24 is available as indicated in a block 62. If not, then the thread 22 waits until global lock 34 is available before acquiring global lock 34 as indicated in a block 63, adding a local list 30 to the linked list of local lists 30 in concurrent bag 24 as indicated in a block 64, and adding the data element 46 to the local list 30 as indicated in a block 65. The thread 22 subsequently releases global lock 34 as indicated in a block 66. Using global lock 34, runtime platform 20 synchronizes the addition of local lists 30 to concurrent bag 24 by threads 22.

In one embodiment, thread 22 calls a function in runtime platform 20 that causes the local list 30 to be added to concurrent bag 24. The function creates an entry 28 in dictionary 26 that identifies the thread 22 in thread identifier 28A and the location of the local list 30 in list identifier 28B. The function also sets the next list identifier 32 of the previous local list 30 (if present), which is identified using the previous entry 28 in dictionary 26, to identify the newly added local list 30. The function further sets the next list identifier 32 of the newly added local list 30 to null. In other embodiments, thread 22 adds the local list 30 to concurrent bag 24 using other suitable programming constructs or one or more functions located outside of runtime platform 20 but in or accessible to the computer system.

Local lists 30 may continue to be added to concurrent bag 24 by arbitrary threads 22 until concurrent bag 24 is deleted. In one embodiment, a thread 22 deletes concurrent bag 24 by calling a function in runtime platform 20. In other embodiments, thread 22 deletes concurrent bag 24 using other suitable programming constructs or one or more functions located outside of runtime platform 20 but in or accessible to the computer system. In embodiments with garbage collection, runtime platform 20 may mark the concurrent bag 24 and local lists 30 for collection by a garbage collector (not shown). In other embodiments, runtime platform 20 may delete the concurrent bag 24 and local lists 30 in other suitable ways.

In some embodiments, a local list 30 of a thread 22 that is aborted may be reassigned to a thread 22 that attempts to add a new local list 30 to concurrent bag 24. In these embodiments, the thread identifier 28A in the dictionary 26 and the thread identifier 42 of a local list 30 of a thread 22 that is aborted are set to identify the thread 22 attempting to add a new local list 30. The existing local list 30 is then used by the thread 22 instead of creating a new local list 30.

Figure 4A:
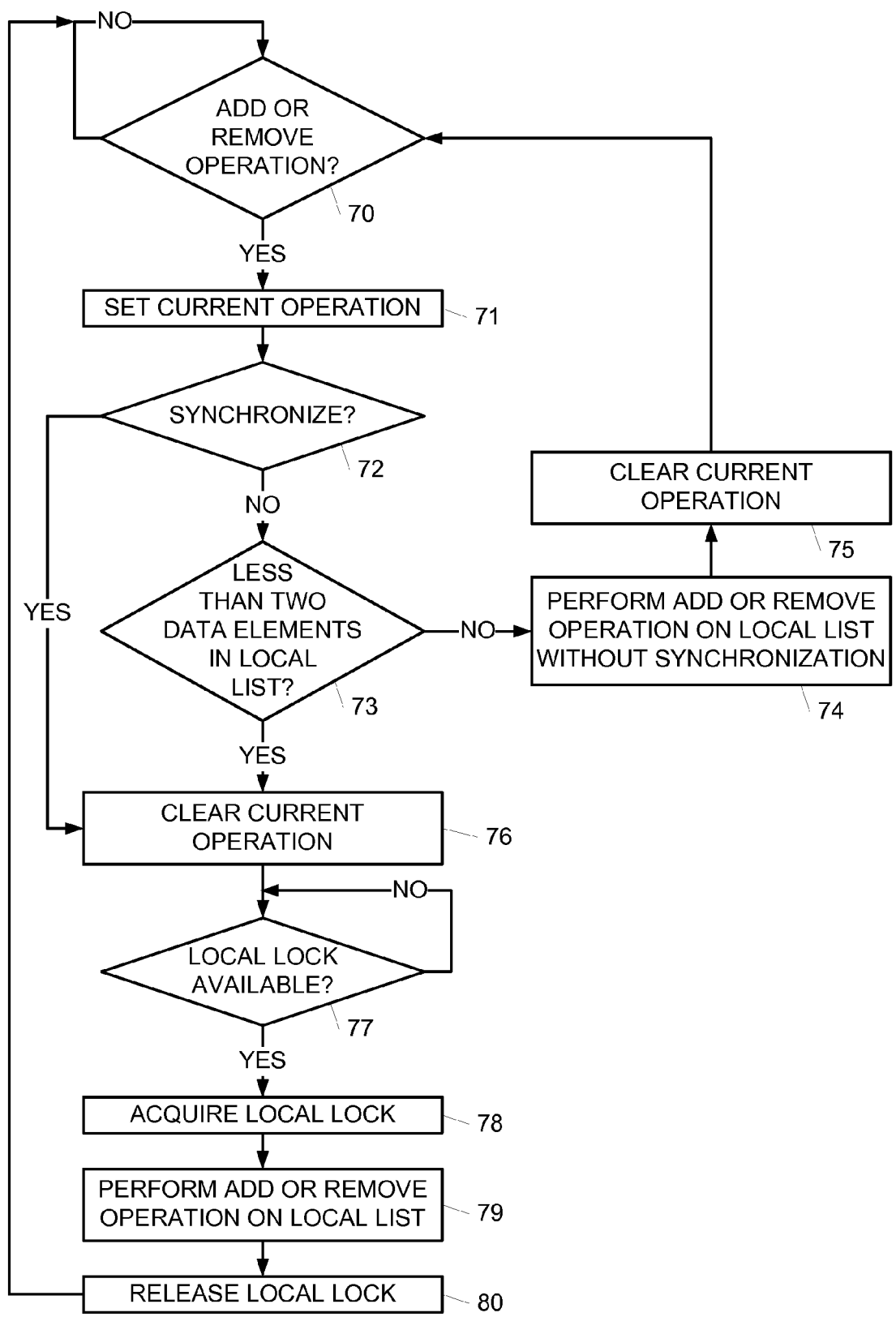
FIGS. 4A-4B are flow charts illustrating embodiments of methods for using local lists in a data structure.

FIG. 4A is a flow chart illustrating an embodiment of a method for using a local list 30 in concurrent bag 24 by a thread 22 that created the corresponding local list 30. The embodiment of FIG. 4A will now be described with reference to the embodiments of FIGS. 1 and 2.

In FIG. 4A, any time that a thread 22 that created a local list 30 seeks to perform an add operation or a remove operation on the corresponding local list 30 as indicated in a block 70, the thread 22 sets the current operation indicator 54 of the corresponding local list 30 to identify the add operation or the remove operation as indicated in a block 71. The thread 22 then accesses the synchronize indicator 36 to determine whether synchronization is to be used while performing the add operation or the remove operation as indicated in a block 72. If the synchronize indicator 36 does not indicate that synchronization is to be used, then the thread 22 determines whether the local list 30 includes less than two data elements 46 by subtracting steal count 52 from count 50 as indicated in a block 73.

If the synchronize indicator 36 does not indicate that synchronization is to be used and the local list 30 includes two or more data elements 46, then the thread 22 performs the add operation or the remove operation on the local list 30 without synchronization as indicated in a block 74. For an add operation, thread 22 adds a data element 46 to a designated end of the linked list and increments count 50. For a remove operation, thread 22 removes a data element 46 from the designated end of the linked list and decrements count 50. The designated end of the linked list is the end of the linked list that is not used by other threads 22 that may steal data elements 46 from the linked list. For example, a thread 22 may perform add and remove operations to the head of the linked list of data elements 46 where other threads 22 may steal from the tail of the linked list of data elements 46. After completing the unsynchronized add or remove operation, the thread 22 clears the current operation indicator 54 as indicated in a block 75.

If the synchronize indicator 36 indicates that synchronization is to be used or the local list 30 includes less than two data elements 46, then the thread 22 clears the current operation indicator 54 as indicated in a block 76. The thread 22 determines whether the local lock 60 of the corresponding local list 30 is available using lock taken indicator 56 as indicated in a block 77. If not, then the thread 22 waits until the local lock 60 is available before acquiring the local lock 60 as indicated in a block 78, performing the add operation or the remove operation (described above) with synchronization as indicated in a block 79, and subsequently releasing the local lock 60 as indicated in a block 80.

Depending on the actual use of concurrent bag 24, accesses to a local list 30 by the thread 22 that created the local list 30 may be largely unsynchronized. Synchronization may be performed under designated circumstances (e.g., enumeration as described below) that are indicated by the synchronize indicator 36 and to ensure thread safety (e.g., when the linked list includes less than two data elements 46).

Figure 4B:
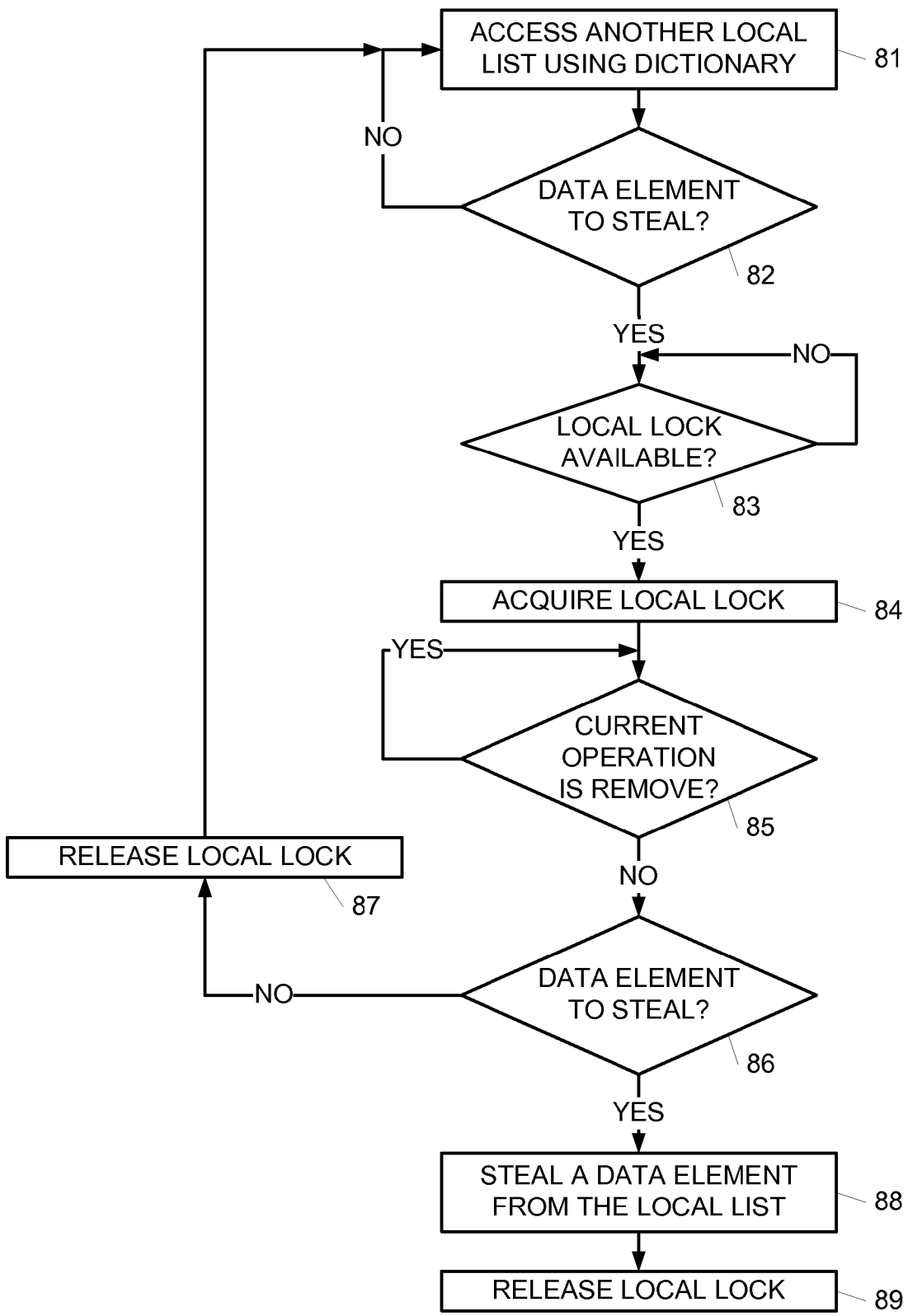

FIG. 4B is a flow chart illustrating an embodiment of a method for using a local list 30 in concurrent bag 24 by a thread 22 other than the thread 22 that created the corresponding local list 30. The embodiment of FIG. 4B will now be described with reference to the embodiments of FIGS. 1 and 2.

In FIG. 4B, a thread 22 may access a local list 30 other than a local list 30 created by the thread 22 using dictionary 26 as indicated in a block 81. When a local list 30 created by the thread 22 does not include any data elements 46 (i.e., the count 50 minus the steal count 52 is zero), the thread 22 may attempt to steal a data element 46 from another local list 30. The thread 22 accesses one or more entries 28 in dictionary 26 until the thread 22 identifies local list 30 with a data element 46 that may be stolen as indicated in a block 82. A local list 30 includes a data element 46 that may be stolen if the head indicator 44 of the local list 30 is not equal to null. The thread 22 may access the entries 28 in the order that the entries appear in dictionary 28 or other suitable order until a local list 30 with a data element 46 that may be stolen is identified.

Once a thread 22 identifies a local list 30 with a data element 46 that may be stolen, the thread 22 determines whether the corresponding local lock 60 of the local list 30 is available using lock taken indicator 56 as indicated in a block 83. If not, then the thread 22 waits until the local lock 60 is available before acquiring the local lock 60 as indicated in a block 84. The thread 22 then waits until any unsynchronized remove operations complete by waiting until the current operation indicator 54 is not set to indicate a remove operation as indicated in a block 85. After all unsynchronized remove operations complete, the thread 22 again ensures that a data element 46 to steal is present as indicated in a block 86. If not, then the thread 22 releases the local lock 60 as indicated in a block 87 and repeats the function of block 81. If so, then the thread 22 steals a data element 46 from the local list 30 and incrementing the steal count 52 of the local list as indicated in a block 88, and subsequently releases the local lock 60 as indicated in a block 89. Stealing, as just described, is performed with synchronization because more than one thread 22 may attempt to steal from the same local list 30.

Figure 5:
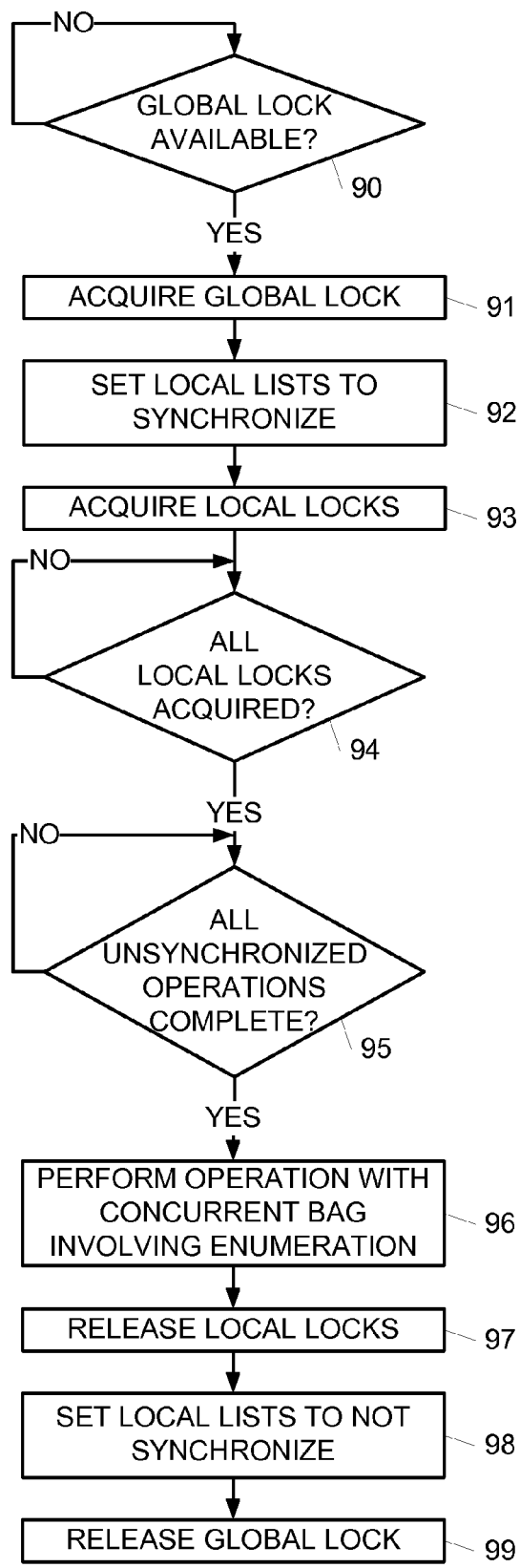
FIG. 5 is a flow chart illustrating an embodiment of a method for performing an operation involving enumeration of a data structure.

FIG. 5 is a flow chart illustrating an embodiment of a method for performing an operation involving enumeration of concurrent bag 24. The embodiment of FIG. 5 will now be described with reference to the embodiments of FIGS. 1 and 2 where a thread 22 calls an operation that involves enumeration of concurrent bag 24. The embodiment of FIG. 5 will be described as being performed by runtime platform 20. In other embodiments, some or all of the functions of FIG. 5, or portions thereof, may be performed by process 12, kernel 14, and/or other components of the computer system (not shown).

In FIG. 5, runtime platform 20 determines whether global lock 34 of concurrent bag 24 is available as indicated in a block 90. If not, then the runtime platform 20 waits until global lock 34 is available before acquiring global lock 34 to prevent any new local lists 30 from being added to concurrent bag 24 as indicated in a block 91. Runtime platform 20 sets the local lists 30 to synchronize using the synchronize indicator 36 to cause any subsequent operations on the local lists 30 to be synchronized as indicated in a block 92 and begins acquiring local locks 60 of each local list 30 as indicated in a block 93.

Runtime platform 20 waits until all local locks are acquired as indicated in a block 94 and all unsynchronized operations are complete as indicated in a block 95 before performing the operation that involves enumeration. For each local list 30, runtime platform 20 waits until both the local lock 60 is acquired and the current operation indicator 54 indicates that no operation is being performed. After the local lock 60 is acquired, no unsynchronized operations (e.g., add or remove operations) may be started by a thread 22 until the local lock 60 is released. The thread 22 may, however, have started an unsynchronized add or remove operation prior to the local lock 60 being acquired by runtime platform 20. Accordingly, runtime platform 20 waits until the current operation indicator 54 of the local list 30 indicates that no operation is being performed to ensure that any unsynchronized add or remove operation completes before beginning the enumeration.

After all local locks are acquired and all unsynchronized operations on all local lists 30 are complete, runtime platform 20 performs the operation that involves the enumeration as indicated in a block 96. By acquiring the global lock 34 and all local locks 60 in blocks 90-95, runtime platform 20 effectively freezes concurrent bag 24 to prevent any new local lists 30 from being added and any data elements from being added to, removed from, or stolen from any local lists 30. With the concurrent bag 24 frozen, runtime platform 20 proceeds with enumerating the concurrent bag 24 by accessing and enumerating the data elements 46 in each local list 30. Runtime platform 20 locates the first local list 30 using the list identifier 28B in the first entry 28 in dictionary 26. Upon locating the first local list 30, runtime platform 20 accesses each data element 46 in the linked list from the data element 46(1) identified by the head indicator 44 through the data element 46(1) identified by the tail indicator 48. When the tail indicator 48 is reached, runtime platform 20 accesses the next list identifier 32 to identify the next local list 30 and repeats the process of enumerating the data elements 46 in this next local list 30. Runtime platform 20 continues identifying and enumerating local lists 30 until the local list 30 with the next list identifier 32 that is null is reached. At this point, runtime platform 20 has completed the enumeration part of the operation and may proceed to complete the overall operation.

The overall operation may be one or more of a Count operation, a CopyTo operation, a ToArray operation, or other suitable operation that involves enumeration. In a Count operation, runtime platform 20 uses the enumeration to count the number of data elements 46 in all local lists 30 in the concurrent bag 24 and returns the count to the thread 22 that called the Count operation. For a CopyTo operation, runtime platform 20 enumerates the concurrent bag 24 to allow the concurrent bag 24 to be copied to a specified location. Runtime platform 20 copies the concurrent bag 24 to the specified location and returns a confirmation indicator to the thread 22 that called the CopyTo operation. For a ToArray operation, runtime platform 20 enumerates the concurrent bag 24 to allow the concurrent bag 24 to be copied to a specified array. Runtime platform 20 copies the concurrent bag 24 to the specified array and returns a confirmation indicator to the thread 22 that called the ToArray operation.

Subsequent to performing the operation, runtime platform 20 releases local locks 60 of each local list 30 as indicated in a block 97, sets the local lists 30 to not synchronize using the synchronize indicator 36 as indicated in a block 98, and releases global lock 34 as indicated in a block 99. By doing so, runtime platform 20 unfreezes the concurrent bag 24 to allow processing of the data elements 46 by threads 22 to resume.

Figure 6:
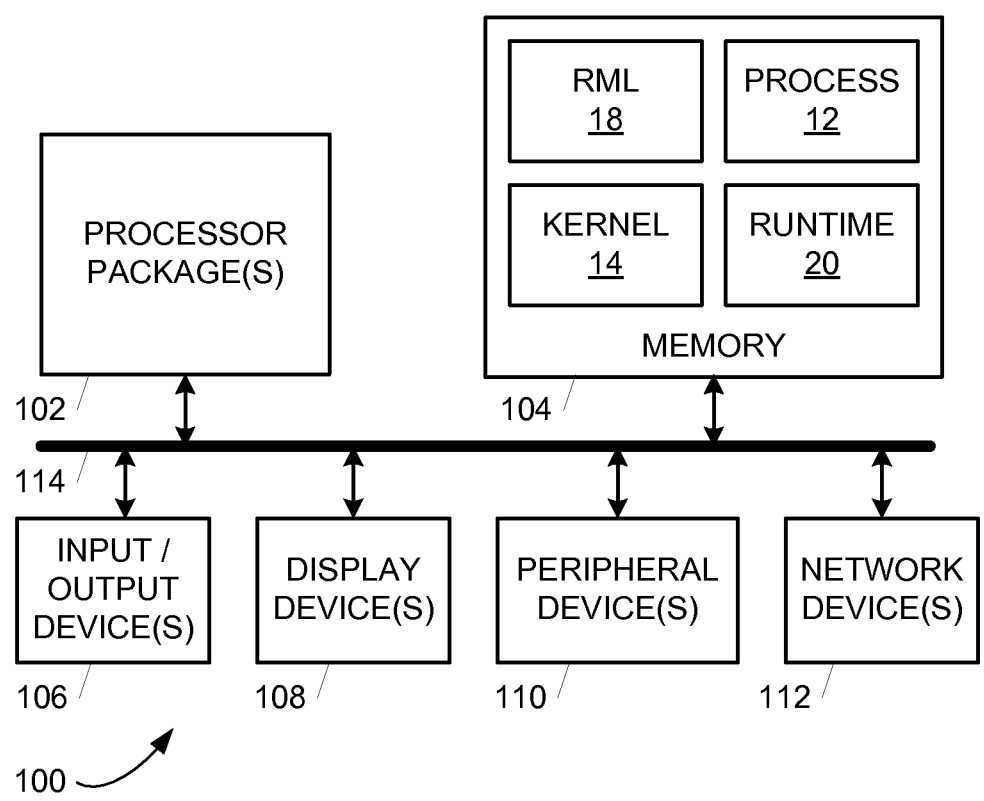
FIG. 6 is a block diagram illustrating an embodiment of a computer system configured to implement a runtime environment that allows a process to execute with multiple concurrent threads.

FIG. 6 is a block diagram illustrating an embodiment of a computer system 100 configured to implement runtime environment 10 (shown in FIG. 1) that allows process 12 to execute with multiple concurrent threads 22.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include processing resources 16(1)-16(N). Each processing resource 16 in processor packages 102 is configured to access and execute instructions stored in memory system 104. The instructions may include a basic input output system (BIOS) or firmware (not shown), process 12, kernel 14, resource management layer 18, and runtime platform 20. Each processing resource 16 may execute the instructions in conjunction with or in response to information received from input/output devices 106, display devices 108, peripheral devices 110, and/or network devices 112.

Memory system 104 includes any suitable type, number, and configuration of volatile or non-volatile storage devices configured to store instructions and data. The storage devices of memory system 104 represent computer readable storage media that store computer-executable instructions including process 12, kernel 14, resource management layer 18, runtime platform 20, and other processes.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. The instructions are executable by a computer system to perform the functions and methods of process 12, kernel 14, resource management layer 18, and runtime platform 20 described herein. Examples of storage devices in memory system 104 include hard disk drives, random access memory (RAM), read only memory (ROM), flash memory drives and cards, and magnetic and optical disks.

Process 12 includes instructions that are executable in conjunction with kernel 14, resource management layer 18, and/or runtime platform 20 to cause desired operations to be performed by computer system 100 as described above with reference to FIG. 1.

Computer system 100 boots and executes kernel 14. Kernel 14 includes instructions executable by processing resources 16 to manage the components of computer system 100 and provide a set of functions that allow process 12 and other processes to access and use the components. In one embodiment, kernel 14 is a Windows operating system. In other embodiments, kernel 14 is another operating system suitable for use with computer system 100.

Resource management layer 18 includes instructions that are executable in conjunction with kernel 14 to allocate resources of computer system 100 including processing resources 16 as described above with reference to FIG. 1. Resource management layer 18 may be included in computer system 100 as a library of functions available to process 12 and other processes or as an integrated part of kernel 14.

Runtime platform 20 includes instructions that are executable in conjunction with kernel 14 and resource management layer 18 to generate runtime environment 10 and provide runtime functions to process 12 and other processes as described above with reference to FIG. 1.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage device storing computer-executable instructions that, when executed in a computer system, perform a method comprising:

acquiring a global lock, with a first thread, on a concurrent bag configured as an enumerable data structure that forms a concurrent collection of data elements that is accessible by a plurality of threads, the concurrent bag configured to minimize using synchronization in accessing the concurrent collection of data elements from the plurality threads, the concurrent bag including a set of local lists configured as a first linked list and a concurrent dictionary that identifies a location of each local list, and each of the set of local lists including a respective second linked list of the data elements, the global lock preventing the plurality of threads other than the first thread from adding or deleting the local lists from the first linked list and preventing any data elements from being added to, removed from, or stolen from any of the local lists of the first linked list until the first thread releases the global lock;
preventing the plurality of threads from accessing the set of local lists without synchronization; and
subsequent to any unsynchronized operations on the set of local lists completing, performing an enumeration of each of the respective second linked lists of the data elements of the local lists using the concurrent dictionary.

2. The computer readable storage device of claim 1, the method further comprising:
preventing the plurality of threads from accessing the set of local lists without synchronization by setting a synchronize indicator corresponding to the concurrent bag; and
acquiring a local lock on each of the local lists in the set prior to performing the enumeration.

3. The computer readable storage device of claim 1, the method further comprising:
detecting that all unsynchronized operations on the concurrent bag from the plurality of threads have completed using a current operation indicator in each of the local lists in the set of local lists.

4. The computer readable storage device of claim 1, the method further comprising:
preventing an additional local list from being added to the set of local lists by one of the plurality of threads subsequent to acquiring the global lock and prior to releasing the global lock.

5. The computer readable storage device of claim 1, the method further comprising:
performing the enumeration as part of one a Count operation, a CopyTo operation, and a ToArray operation.

6. The computer readable storage device of claim 1, the method further comprising:
identifying a first location of a first one of the set of local lists using an entry corresponding to the one of the set of local list in the concurrent dictionary; and
identifying a second location of a second one of the set of local lists using a next list identifier in the first one of the set of local lists.

7. The computer readable storage device of claim 1, the method further comprising:
subsequent to performing the enumeration, releasing the global lock on the concurrent bag to allow an additional local list to be added to the set of local lists by one of the plurality of threads; and
allowing the plurality of threads to access the set of local lists without synchronization.

8. A method performed in a process executing on a computer system, the method comprising:
creating a concurrent bag configured as an enumerable data structure that forms a concurrent collection of data elements that is accessible to first and second threads concurrently, the concurrent bag configured to minimize using synchronization in accessing the concurrent collection of data elements from the first and second threads, the concurrent bag including a concurrent dictionary;
adding first and second local lists included in a set of local lists configured as a linked list of local lists from the first and the second threads, respectively, to the concurrent bag and first and second identifiers of the first and the second local lists, respectively, to the concurrent dictionary;
acquiring a global lock on the concurrent bag that prevents the first and second threads from adding or deleting the local lists from the first linked list of local lists and prevents any data elements from being added to, removed from, or stolen from any of the local lists of the first linked list until the global lock is released;
storing an identifier in the first local list that identifies a location of the second local list;
adding a first plurality of data elements from the first thread to the first local list as a first linked list;
accessing a first one of the first plurality of data elements from a first end of the first linked list with the first thread; and
stealing a second one of the first plurality of data elements from a second end of the first linked list with the second thread.

9. The method of claim 8, further comprising:
adding a second plurality of data elements from the second thread to the second local list as a second linked list;
accessing a first one of the second plurality of data elements from a first end of the second linked list with the second thread; and
stealing a second one of the second plurality of data elements from a second end of the second linked list with the first thread.

10. The method of claim 8, further comprising:
acquiring a global lock on the concurrent bag prior to adding the first local list to the concurrent bag.

11. The method of claim 8, further comprising:
acquiring a local lock of the first local list prior to adding the first plurality of data elements to the first local list in response to a synchronize indicator being set.

12. The method of claim 8, further comprising:
acquiring a local lock of the first local list prior to adding the first plurality of data elements to the first local list in response to the first local list including less than two data elements.

13. The method of claim 8, further comprising:
adding the first plurality of data elements to the first local list without synchronization in response to a synchronize indicator not being set and the first local list including at least two data elements.

14. The method of claim 8, further comprising:
acquiring a local lock of the first local list prior to stealing the second one of the first plurality of data elements from the second end of the first linked list with the second thread.

15. The method of claim 8, further comprising:
preventing the first and the second threads from accessing the first and the second local lists without synchronization; and
subsequent to any unsynchronized operations on the first and the second local lists completing, performing an enumeration of the first plurality of data elements and a second plurality of data elements in the first and the second local lists, respectively, using the concurrent dictionary.

16. The method of claim 15, further comprising:
preventing the first and the second threads from accessing the first and the second local lists without synchronization by setting a synchronize indicator in the concurrent bag; and
acquiring first and second local locks on the first and the second local lists, respectively, prior to performing the enumeration.

17. A method performed by a computer system executing a process, the method comprising:
acquiring a global lock on a concurrent bag configured as an enumerable data structure that forms a concurrent collection of data elements that is accessible by a first and second threads, the concurrent bag configured to minimize using synchronization in accessing the concurrent collection of data elements from the first and second threads, the concurrent bag including a first and a second local lists included in a set of local lists configured as a linked list of local lists and a concurrent dictionary with first and second entries that identify first and second locations, respectively, of the first and the second local lists, respectively, the first and the second local lists including a first and second linked lists of data elements, respectively, and the first local list including a list identifier that identifies the second location of the second local list, the global lock preventing the first and second threads from adding or deleting the local lists from the first linked list of local lists and prevents any data elements from being added to, removed from, or stolen from any of the local lists of the first linked list until the global lock is released;

preventing the first and the second threads from accessing the first and the second local lists without synchronization; and subsequent to any unsynchronized operations on the first and the second local lists completing, performing an enumeration of the first and the second linked lists of data elements of the first and the second local lists using the first entry and the list identifier.

18. The method of claim 17, further comprising:

preventing the first and the second threads from accessing the first and the second local lists without synchronization by setting a synchronize indicator in the concurrent bag; and acquiring first and second local locks on the first and the second local lists prior to performing the enumeration.

19. The method of claim 17, further comprising:

detecting that all unsynchronized operations on the concurrent bag from the first and the second threads have completed using first and second current operation indicators in the first and the second local lists, respectively.

20. The method of claim 17, further comprising:

subsequent to performing the enumeration, releasing the global lock on the concurrent bag to allow a third local list to be added to the set of local lists by the first thread; and allowing the first and the second threads to access the first and the second local lists without synchronization.

\* \* \* \* \*